US 8,485,660 B2

(12) United States Patent
Tubin

(10) Patent No.: US 8,485,660 B2
(45) Date of Patent: Jul. 16, 2013

(54) EYEWEAR FRAME INCLUDING VISOR

(75) Inventor: William E. Tubin, Chelsea, MA (US)

(73) Assignee: Solergy Sunglasses, Inc., Revere, MA (US)

( * ) Notice: Subject to any disclaimer, the term of this patent is extended or adjusted under 35 U.S.C. 154(b) by 24 days.

(21) Appl. No.: 13/242,760

(22) Filed: Sep. 23, 2011

(65) Prior Publication Data

US 2012/0075570 A1    Mar. 29, 2012

Related U.S. Application Data

(60) Provisional application No. 61/385,754, filed on Sep. 23, 2010.

(51) Int. Cl.
*G02C 3/00* (2006.01)
*G02C 3/02* (2006.01)
*A42B 1/24* (2006.01)

(52) U.S. Cl.
CPC .. *G02C 3/02* (2013.01); *A42B 1/247* (2013.01)
USPC ................................. 351/155; 2/13; 2/209.13

(58) Field of Classification Search
CPC ................................... G02C 3/02; A42B 1/247
USPC .................... 351/41, 44, 155, 158; 2/15, 10, 2/12, 13, 209.13
See application file for complete search history.

(56) References Cited

U.S. PATENT DOCUMENTS

| 5,390,369 A | 2/1995 | Tubin |
| 5,438,378 A | 8/1995 | Blatter |
| 5,619,287 A * | 4/1997 | Tseng ............................. 351/44 |
| 6,056,400 A * | 5/2000 | Knepp ......................... 351/155 |
| 6,711,744 B1 | 3/2004 | Hockenbury |
| 6,944,882 B2 | 9/2005 | Lawrence et al. |
| 2007/0216854 A1 * | 9/2007 | Yang et al. ...................... 351/90 |

* cited by examiner

*Primary Examiner* — Huy K Mai
(74) *Attorney, Agent, or Firm* — Cesari and McKenna, LP

(57) ABSTRACT

Eyewear formed generally as frame component and a visor component that may be manufactured as two separate pieces and then assembled together. The frame has a slot formed in a top portion thereof shaped to engage a downwardly extending flange on the visor. Fasteners can be used to hold the visor securely to the frame. In preferred embodiments, the visor not only extends forward but also rearward of the frame to occlude light entering between the visor, frame and the wearer's forehead.

4 Claims, 9 Drawing Sheets

EYEWEAR FRAME INCLUDING VISOR

RELATED APPLICATION

This application claims the benefit of U.S. Provisional Application No. 61/385,754, filed on Sep. 23, 2010. The entire teachings of the above application are incorporated herein by reference.

BACKGROUND

The present disclosure relates to eyewear including, but not limited to sunglasses, having a frame that includes a visor.

Anti-solar and anti-glare protective eyewear are often called "sunglasses" even though constructed exclusively of plastic rather than glass. Such eyewear is intended to offer comfort and protection for the eyes against direct sunlight, glare, reflected glare related visible and near visible radiation, including ultraviolet and near ultraviolet radiation. It is also known that many people require eyewear with corrective lenses either for reading or viewing objects at a distance.

Conventional eyewear frames, while functional for their protective or corrective purposes, are not completely satisfactory in all situations. For example, it is often desirable in overhead bright light conditions and/or for certain user activities to reduce impingement of sunlight as much as possible. People thus often also wear a hat with their eyewear to reduce their exposure to ambient light even more.

A number of sunglasses known to exist provide some measure of addressing this issue with a visor integrally formed with the bridge portion of the frame, such as described in U.S. Pat. No. 5,390,369 issued to William Tubin.

BRIEF SUMMARY

Certain desirable eyewear frame shapes can require the manufacture of plastic pieces having compound curves of different radii in three dimensions. These can be difficult and expensive to manufacture as a single extrusion or in other integral forms; even some design shapes, although quite desirable from a fashion perspective, may even be impossible to manufacture.

In particular aspects, a preferred design for eyewear that solves these problems includes a lens frame that sweeps in an arc over the bridge of a nose portion and across both eye portions between opposed extremity points. An arcuate groove extends along the top of the frame between the extremities but not extending entirely out thereto.

A separate visor element of the same general arcuate shape as the top of the frame has a main plane that extends at least beyond both the forward face, and preferable also from rear face of the frame. The visor has a flange extending generally downward and perpendicular to a main plane of the visor. The flange is also the same general arcuate shape and of a size to snugly fit into and engage the slot in the top of the frame.

The flange may have tabs that are aligned with holes formed in the frame.

The flange may be secured to the frame with adhesive and/or fasteners that may be applied and/or inserted during assembly.

The optional inward extending portion of the flange may form a lip that extends the visor line rearward, towards the forehead of the wearer, to occlude overhead light from entering a space between the frame and the wearer's forehead.

The opposed extremity points may further provide attachments such as hinges to support temple arm pieces.

By manufacturing the frame with a slot on the top portion thereof, separately manufacturing the visor as a separate piece, and then fitting and fastening the two pieces together, a greater variety of fashionable shapes can now be manufactured at reduced cost.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Figure 1A:
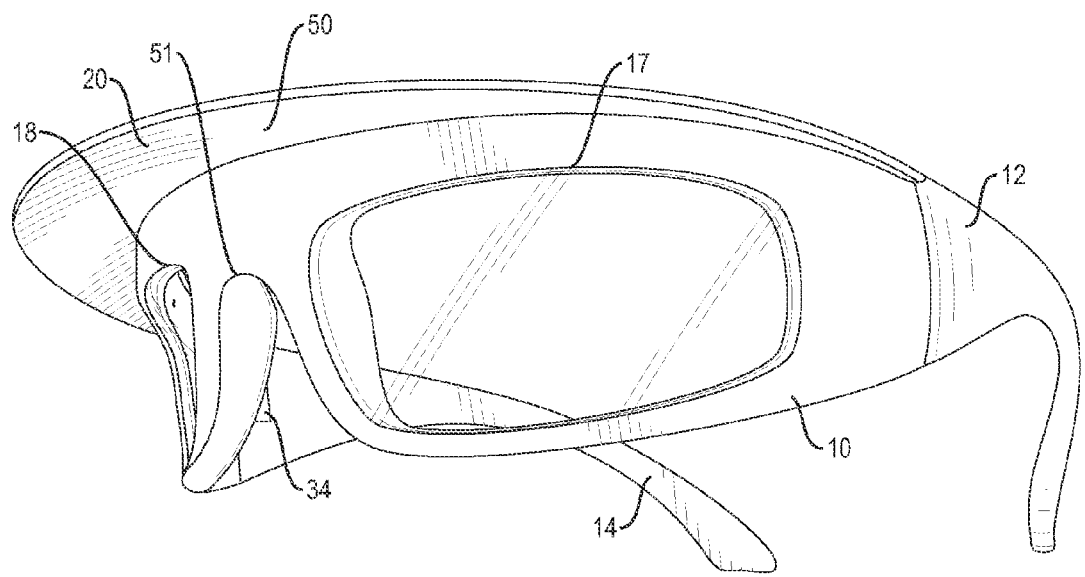
FIG. 1A is a front side oblique view of an assembled frame, visor and temple arms.
Figure 1B:
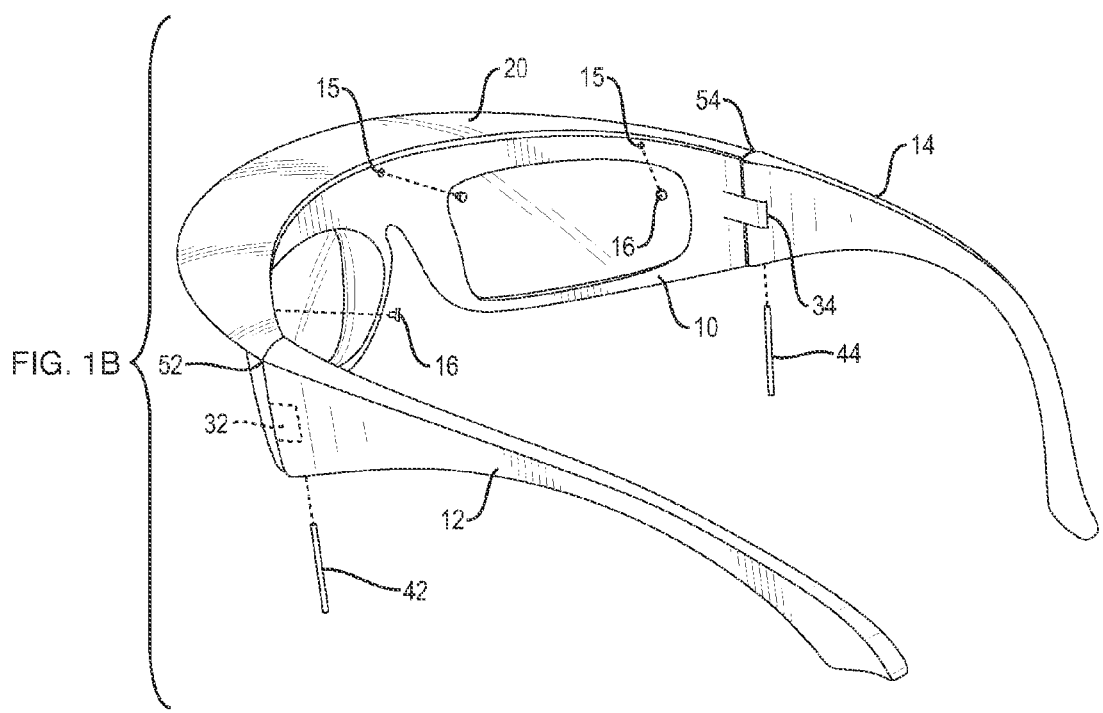
FIG. 1B is a view showing a person wearing the glasses.

As shown in FIGS. 1A and 1B, an eyewear frame component 10 has left and right eye openings 17, 18 for accommodating lenses. The frame 10 has a generally arcuate shape, sweeping backwards in both directions from a central bridge portion 50 at the nose 51. A pair of movable temple arms 12, 14 are generally disposed at opposite extremities 52, 54 of the frame 10 and are coupled to the frame 10 via a corresponding pair of hinges 32, 34 and hinge fasteners such as screws or pins 42, 44. It should be understood that there are numerous other ways for temple arms 12, 14 to attach to frame 10.

A visor 20 sweeps arcuately in generally the same shape as the top of the frame 10. The visor 20 sits on top of the frame 10 over the bridge area 50 which itself is above the nose portion 52. Visor 20 extends in a forward direction over at least the two lens openings 17, 18 between the extremities 52, 54. The forward edge of visor 20 is also of an arcuate shape, but more pronounced in a forward direction than the top of the frame 10.

In preferred arrangements, the visor 20 is positioned and shaped with respect to the frame such that the wearer's horizontal and vertical field of view is not appreciably occluded.

As would be understood shortly, with frame 10 and visor 20 being separately manufactured, holes 15 are formed in the frame 10 along an upper portion thereof such as at the bridge area 50 and on either side of the bridge 50 towards the extremities 52, 54 but still in a portion above the lens openings 17, 18. The holes 15 may be threaded, or not. Each hole accommodates a fastener 16. The fasteners 16 and holes 15 hold visor 20 in position on frame 10.

Figure 1C:
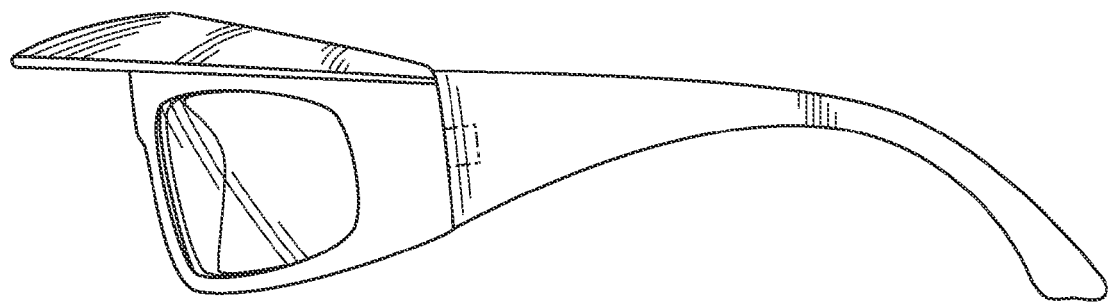
FIG. 1C is a rear side oblique view of the same.

FIG. 1C is a side view of the assembled eyewear.

Figure 1D:
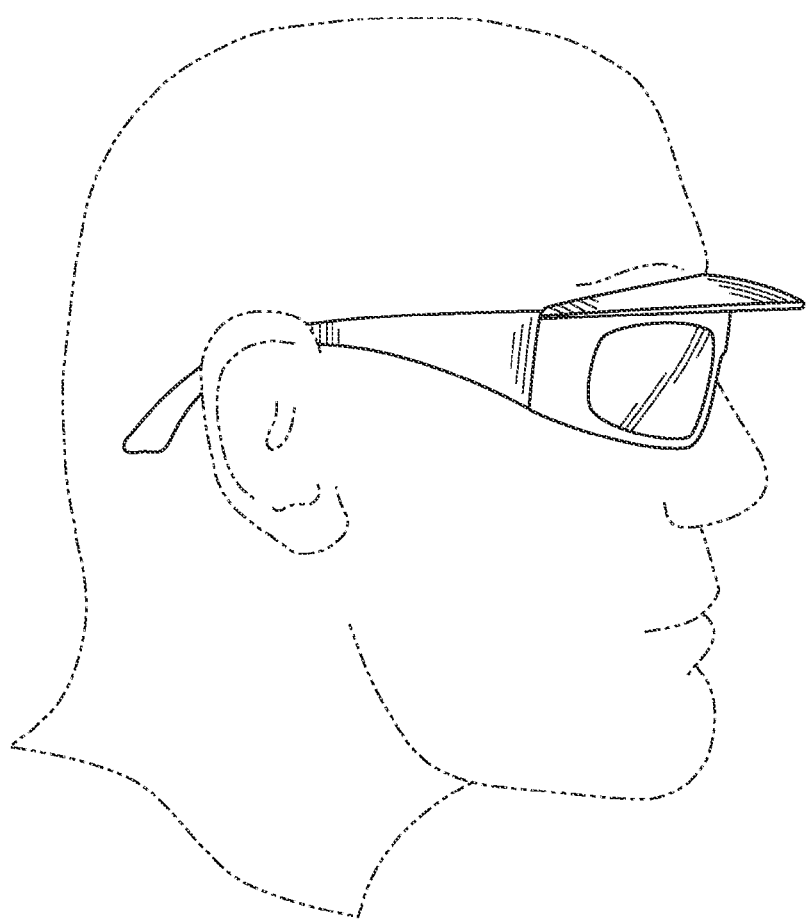
FIG. 1D is a detailed side view of the glasses.

FIG. 1D is an illustration showing the assembled eyewear being worn by a person, and illustrating the relative angle of the visor 20 and front of frame 10 with respect to the face.

Figure 2A:
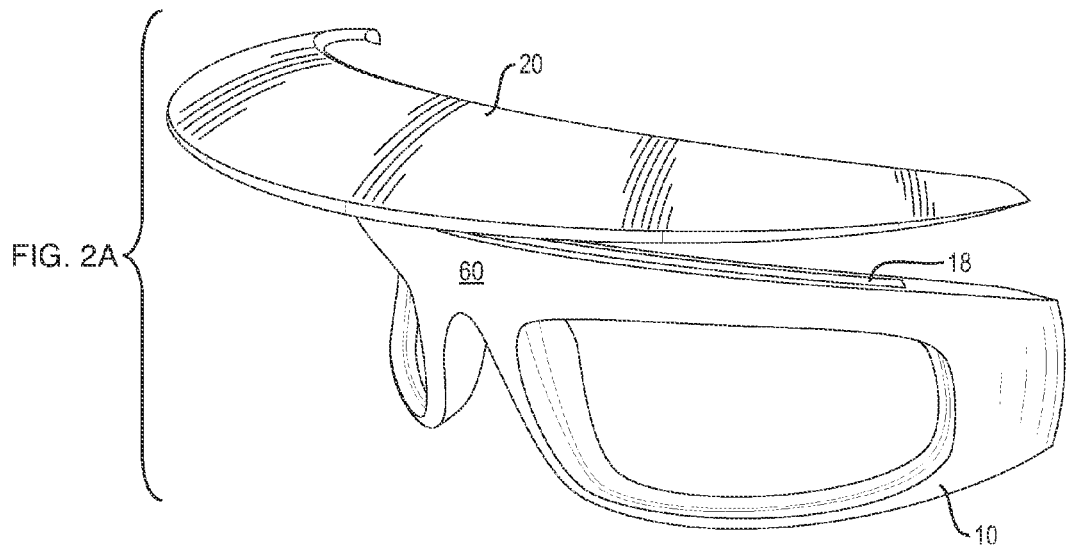
FIG. 2A is a left front oblique view showing the visor before being installed on the frame and particularly showing the slot in the frame.
Figure 2B:
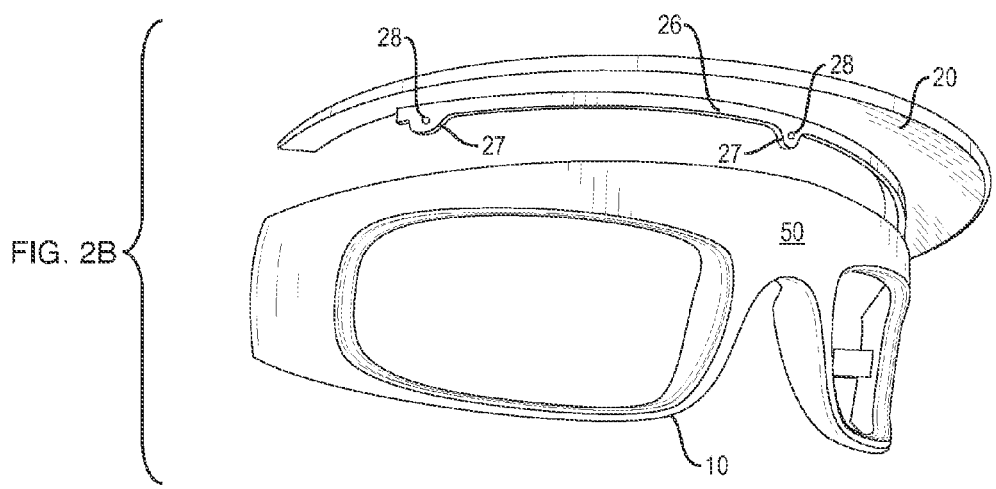
FIG. 2B is an oblique view from the right side and slightly below, showing the flange on the visor, and tabs and holes formed therein.

As shown in more detail in FIGS. 2A and 2B, the frame 10 preferably has a slot 18 formed along the upper extremity thereof. The slot 18 has the same generally arcuate shape as the frame 10.

The visor 20 can have a flange 26 formed on a bottom surface thereof with the flange 26 having about the same shape and size as the slot 18 in the frame 10. The visor 20 is thus attached to the frame 10 by inserting the flange 26 in the slot 18 and attaching fasteners 16 into holes 15. Secure attachment of the visor 20 to the frame 10 is further ensured by the use of tabs 27 located on the flange 26 that correspond to the location of holes 15 in frame 10. Additional holes 28 in the tabs 27 are aligned with holes 15 to let fasteners 16 securely attach visor 20 to frame 10.

As is evident in FIGS. 2A and 2B, the visor 20 extends beyond a front face 60 of frame 10 to provide the wearer with shade from ambient sunlight. In addition, the rearward portion of the visor 20 extends beyond the rear face of the frame 10. This rearward extension occludes light entering between the frame 10 and the wearer's forehead. This feature is also readily seen in FIG. 5B.

Figure 3A:
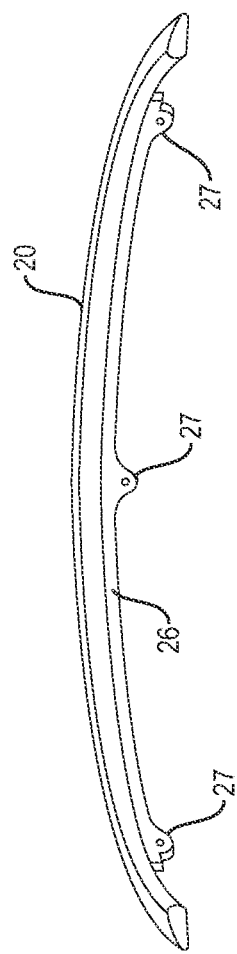
FIGS. 3A and 3B are rear and front elevational views of the visor.

FIG. 3A is a rear elevational view of the visor 20 showing the location of the flange 26 and tabs 27 in more detail.

Figure 3B:
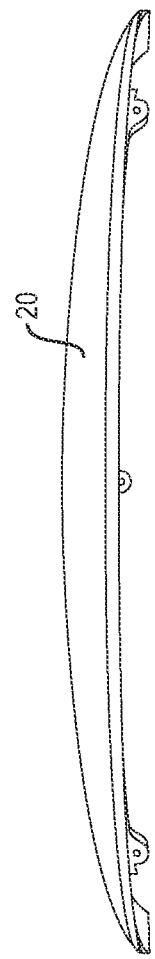

FIG. 3B is a front elevational view of the visor 20.

Figure 4:
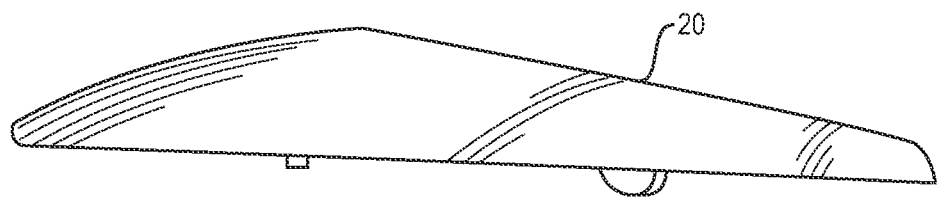
FIG. 4 is a side elevational view of the visor.

FIG. 4 is a side elevational view of visor 20 further detailing its generally arcuate shape extending from a position beyond the front plane of the frame 10 (shown in dotted lines in FIG. 4) and sweeping backward towards the extremity locations 52, 54.

In one embodiment, the frame may be 5 mm thick more or less in the bridge area 50, and the distance between the inside corners of the visor may be 134 mm, the width of the visor may be 27 mm at the center, 5 mm at the ends, and 24 mm at a point midway between the center and the ends; the inside overhang of the visor may be 4 mm, and the outside overhang about 20 mm, and the visor may be about 10 mm high.

Figure 5A:
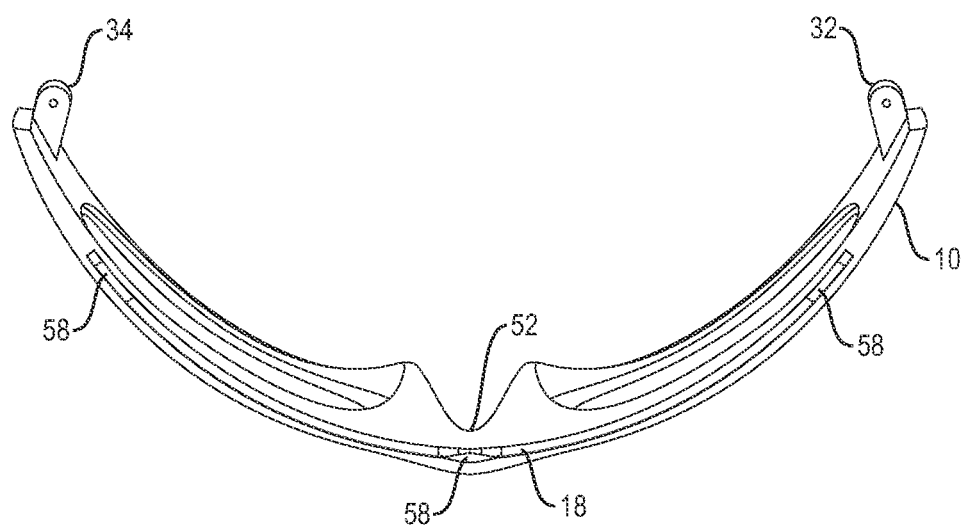
FIG. 5A is a top view of the frame showing the slot, bridge area and hinge pieces in more detail.

FIG. 5A is a top view of the frame 10 showing the various features thereof in more detail. The slot 18 is seen from above with detents 58 forming a space therein to accommodate the tabs 27 when visor 20 is inserted into frame 10.

Figure 5B:
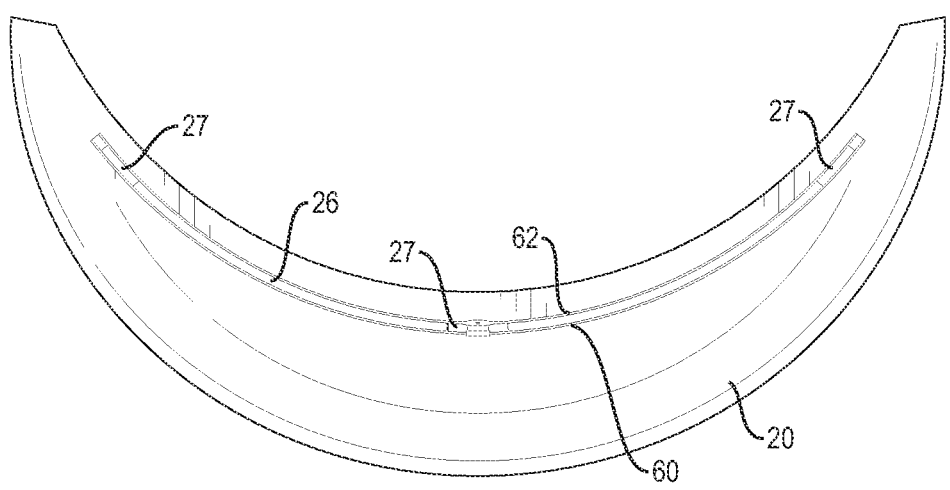
FIG. 5B is a bottom view of the visor showing the flange and tabs.

FIG. 5B is a bottom view of visor 20 showing the flange 26 and tabs 27 from a straight on view. The extent of the visor 20 beyond the front face 60 of the frame 10 and the extent that it extends rearward beyond the rear face 62 of frame 10 is also seen in this figure.

Figure 6:
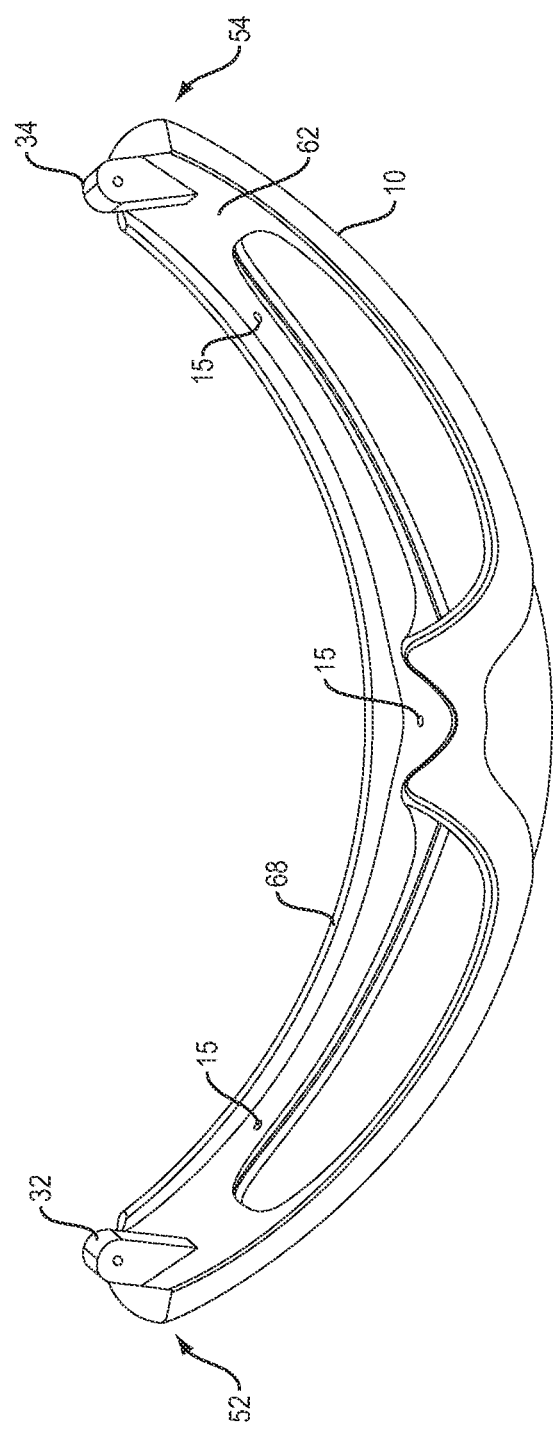
FIG. 6 is a bottom view of the frame.

FIG. 6 is a bottom elevational view of frame 10 showing the location of three holes 15 and the rear face 62 thereof as seen in this view. The frame 10 may optionally have a ridge 68 that extends rearward from the rear face 62 thereof to further provide support for visor and protection from overhead light 20.

In other embodiments, the frame and visor may tale other forms.

Figure 7A:
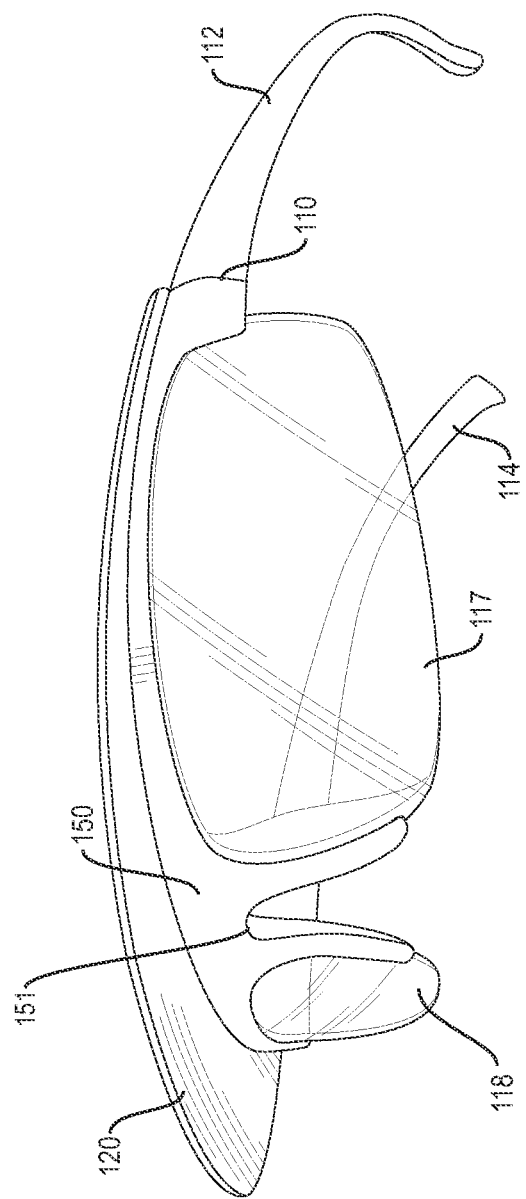
FIGS. 7A and 7B left front and right rear oblique views of a half-frame embodiment with the visor formed integrally with the frame.
Figure 7B:
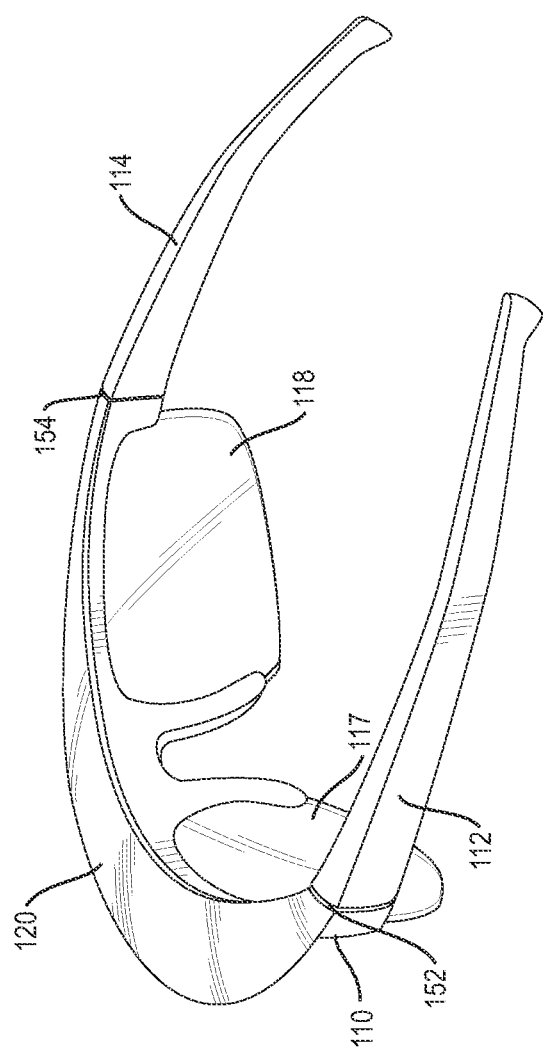

As shown in FIGS. 7A and 7B, the frame 110 may be a half-frame of the type where lower edges of the lenses 117, 118 are exposed and not supported by any portion of the frame.

In this embodiment, the visor 120 is integrally formed with the frame 110 as a single molded piece, eliminating the assembly process needed for the frame with visor shown in FIG. 1A to FIG. 6.

In other arrangements, not shown but contemplated herein, the visor may be integrally formed with full frame eyeglasses. The visor may also be manufactured as a separate piece and assembled to a half-frame eyeglasses.

While this invention has been particularly shown and described with references to example embodiments thereof, it will be understood by those skilled in the art that various changes in form and details may be made therein without departing from the scope of the invention encompassed by the appended claims.

What is claimed is:

1. An eyewear apparatus comprising:
   a frame sweeping arcuately from a bridge portion between opposed extremities, the frame having a top portion with a longitudinal slot formed therein; and
   a visor sweeping arcuately and in the same general shape as the top portion of the frame, the visor having a main plane, and a flange that extends downwardly from the main plane, the flange shaped to engage the slot in the top portion of the frame, and the visor of a shape to also extend at least forward of a front face of the frame along the main plane.

2. The apparatus of claim 1 wherein the visor is also of a shape that extends rearward of a rear face of the frame.

3. The apparatus of claim 1 additionally comprising:
   one or more fasteners for attaching the visor to the frame.

4. The apparatus of claim 1 additionally comprising:
   adhesive disposed at two or more locations along where the flange engages the slot.

* * * * *